United States Patent
Chen et al.

(10) Patent No.: US 10,102,505 B2
(45) Date of Patent: Oct. 16, 2018

(54) SERVER-IMPLEMENTED METHOD, TERMINAL-IMPLEMENTED METHOD AND DEVICE FOR ACQUIRING BUSINESS CARD INFORMATION

(71) Applicant: Xiaomi Inc., Beijing (CN)

(72) Inventors: Zhijun Chen, Beijing (CN); Wendi Hou, Beijing (CN); Qiuping Qin, Beijing (CN)

(73) Assignee: XIAOMI INC., Beijing ( * ) Notice: Subject to any disclaimer, the term of this patent is extended or adjusted under 35 U.S.C. 154(b) by 35 days.

(21) Appl. No.: 15/343,179

(22) Filed: Nov. 3, 2016

(65) Prior Publication Data

US 2017/0161684 A1 Jun. 8, 2017

(30) Foreign Application Priority Data

Dec. 4, 2015 (CN) .......................... 2015 1 0886424

(51) Int. Cl.
*G06K 9/00* (2006.01)
*G06Q 10/10* (2012.01)

(52) U.S. Cl.
CPC ....... *G06Q 10/109* (2013.01); *G06K 9/00228* (2013.01); *G06K 9/00281* (2013.01); *G06K 9/00288* (2013.01)

(58) Field of Classification Search
CPC ............. G06K 9/00221; G06K 9/3258; G06K 9/3283; G06T 1/0071; H04W 4/001
USPC .................................................. 382/100, 118
See application file for complete search history.

(56) References Cited

U.S. PATENT DOCUMENTS

2015/0278248 A1* 10/2015 Chen ................. G06F 17/30256
382/118

FOREIGN PATENT DOCUMENTS

| CN | 103428371 A | 12/2013 |
|---|---|---|
| CN | 103440346 A | 12/2013 |
| CN | 104463076 A | 3/2015 |
| CN | 104540086 A | 4/2015 |
| CN | 104715228 A | 6/2015 |
| CN | 105468767 A | 4/2016 |

OTHER PUBLICATIONS

Extended European Search Report of EP 16200996.
International Search Report of PCT/CN2016/097214.

* cited by examiner

*Primary Examiner* — Charlotte M Baker
(74) *Attorney, Agent, or Firm* — Jun He Law Offices P.C.; James J. Zhu

(57) ABSTRACT

A server-implemented method, a terminal-implemented method and a device for acquiring business card information are provided. The server-implemented method includes: receiving a request for acquiring business card information sent by a terminal of a first user, and the request for acquiring business card information includes facial feature information of a target user; determining identity information of the target user according to the facial feature information of the target user; verifying the request for acquiring business card information sent by the terminal of the first user; sending business card information corresponding to the identity information of the target user to the terminal of the first user if the request for acquiring business card information sent by the terminal of the first user is verified successfully.

16 Claims, 16 Drawing Sheets

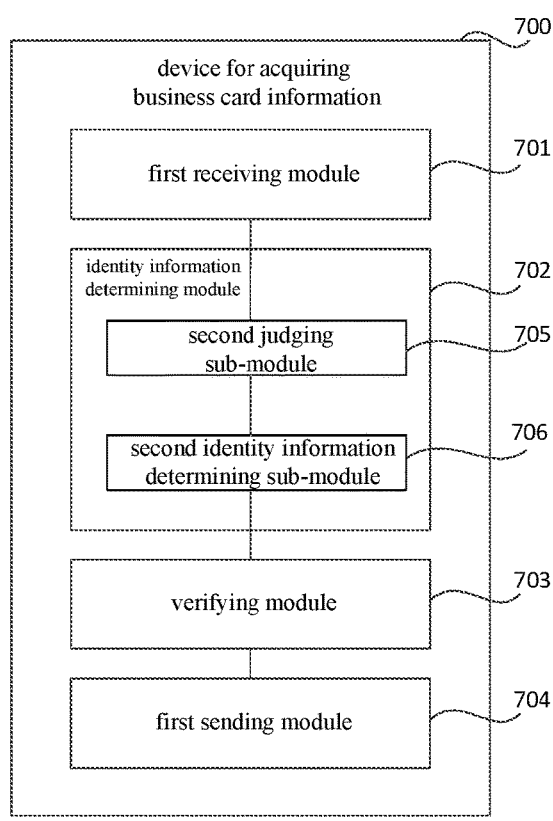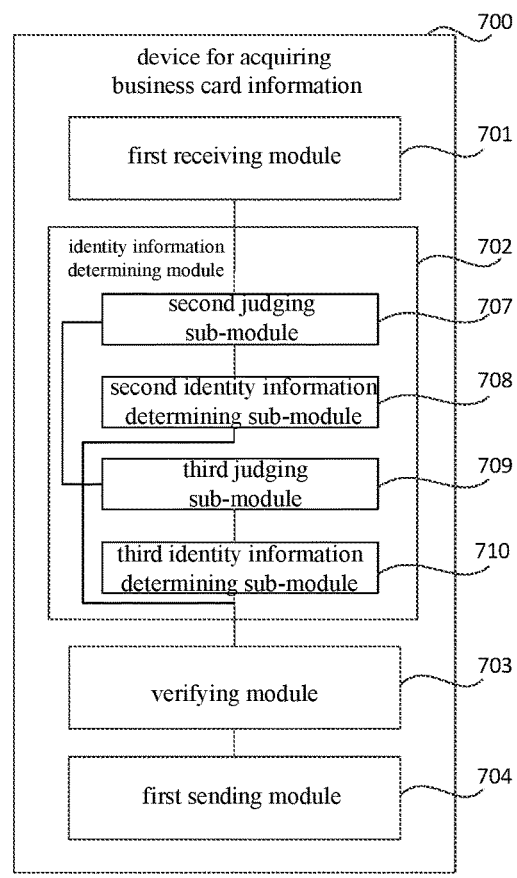
Fig. 7C
Fig. 7D

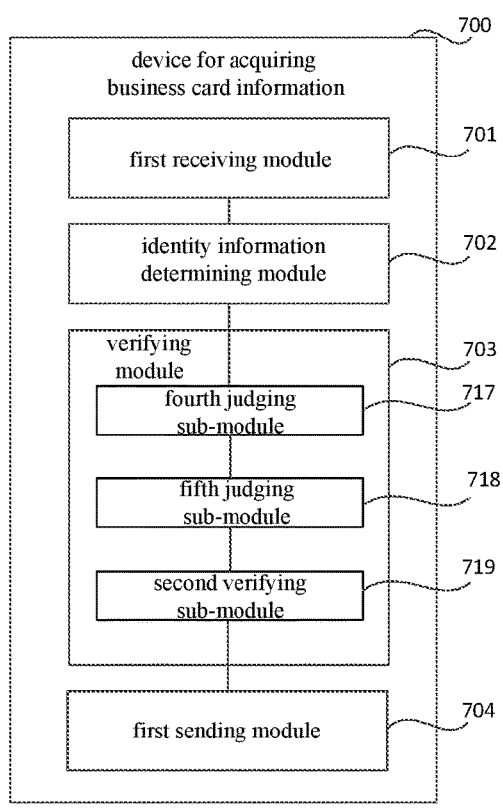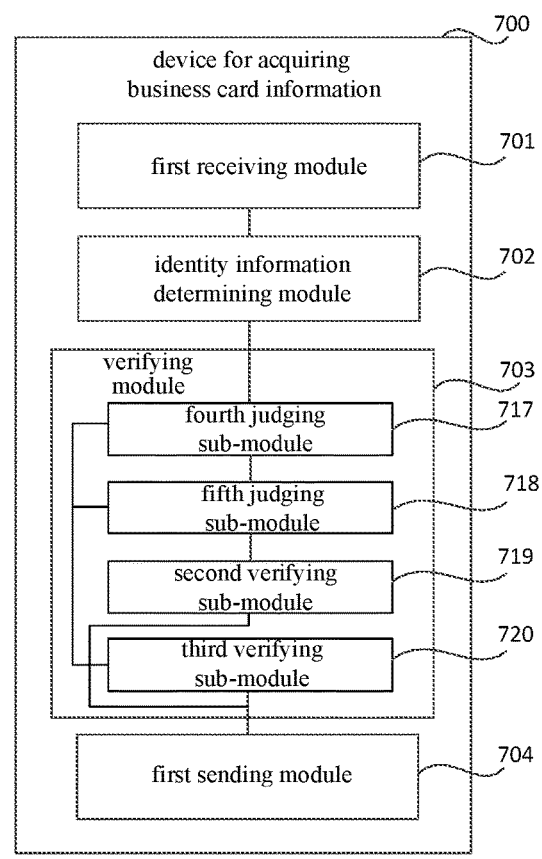
Fig. 7G
Fig. 7H

SERVER-IMPLEMENTED METHOD, TERMINAL-IMPLEMENTED METHOD AND DEVICE FOR ACQUIRING BUSINESS CARD INFORMATION

CROSS-REFERENCE TO RELATED APPLICATION

This application claims priority to and benefits of Chinese Patent Application Serial No. 2015108864247, filed with the State Intellectual Property Office of P. R. China on Dec. 4, 2015, the entire content of which is incorporated herein by reference.

FIELD

The present disclosure relates to a field of intelligent terminal, and more particularly, to a server-implemented method, a terminal-implemented method and a device for acquiring business card information.

BACKGROUND

When people need to exchange their business cards in their daily lives, one way is to input information of other's business card manually into a terminal and store it. For a user, the operation of this way is cumbersome and the manual input information is prone to error. Another way is to acquire the other's business card and scan the two-dimensional code on the business card thereafter, in this way, the business card information may be analyzed from the two-dimensional code and stored. This way simplifies users' operations compared to the manual-input way, but if the other's business card is not at hand, or there is no two-dimensional code on the business card, the information of the other's business card is unable to be acquired.

SUMMARY

According to a first aspect of embodiments of the present disclosure, a server-implemented method for acquiring business card information is provided. The method includes: receiving a request for acquiring business card information sent by a terminal of a first user, and the request for acquiring business card information includes facial feature information of a target user; determining identity information of the target user according to the facial feature information of the target user; verifying the request for acquiring business card information sent by the terminal of the first user; and sending business card information corresponding to the identity information of the target user to the terminal of the first user if the request for acquiring business card information sent by the terminal of the first user is verified successfully.

According to a second aspect of embodiments of the present disclosure, a terminal-implemented method for acquiring business card information is provided. The method includes: acquiring a facial image of a target user; extracting facial feature information from the facial image; sending a request for acquiring business card information to a server, and the request for acquiring business card information includes the facial feature information; receiving business card information of the target user from the server; and storing the business card information of the target user.

According to a third aspect of embodiments of the present disclosure, a device for acquiring business card information is provided. The device includes: a processor; a memory for storing an instruction executable by the processor; and the processor is configured to perform: receiving a request for acquiring business card information sent by a terminal of a first user, and the request for acquiring business card information includes facial feature information of a target user; determining identity information of the target user according to the facial feature information of the target user; verifying the request for acquiring business card information sent by the terminal of the first user; and sending business card information corresponding to the identity information of the target user to the terminal of the first user if the request for acquiring business card information sent by the terminal of the first user is verified successfully.

It should be understood that the above general descriptions and the following detail descriptions are explanatory and illustrative, and these descriptions shall not be construed to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 7A to FIG. 7I are block diagrams of a device for acquiring business card information according to an example embodiment of the present disclosure;

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
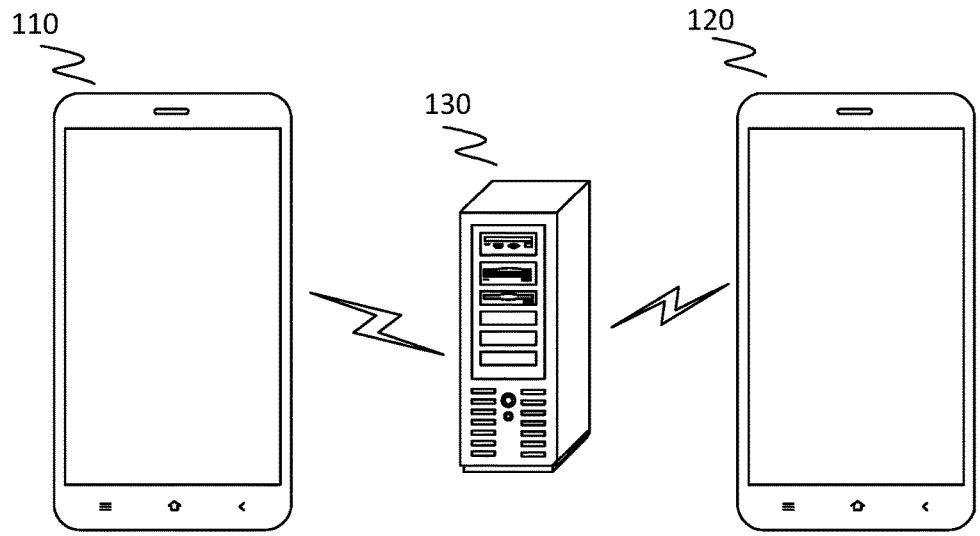
FIG. 1 is a schematic diagram of an implement environment according to an example embodiment of the present disclosure.

FIG. 1 is a schematic diagram of an implement environment according to an example embodiment of the present disclosure. The implement environment may include a first terminal 110, a second terminal 120 and a server 130. Communications may be conducted through various wired networks or wireless networks between the first terminal 110 and the server 130, and between the second terminal 120 and the server 130. The network, for example, may include but is not limited to: wireless fidelity (WiFi) network, 2G network, 3G network, 4G network etc.

The first terminal 110 and the second terminal 120 may be any kind of electronic terminal devices. In the present disclosure, each of the first terminal 110 and the second terminal 120, for example, may be a smart phone, a tablet computer, a personal digital assistant (PDA), a PC, a laptop etc. FIG. 1 illustrates that the first terminal 110 and the second terminal 120 are smart phones. In addition, the server 130 may be any kind of computing devices configured to store data information.

The first terminal 110, for example, may be used by a first user, and the second terminal 120 may be used by a second user. The first user may register on the server 130 through the first terminal 110, and create an account of the first user on the server 130. Similarly, the second user may register on the server 130 through the second terminal 120, and create an account of the second user on the server 130. In this way, the first user may store the personal data related to himself or herself in the corresponding account in the server 130 and the second user may store the personal data related to himself or herself in the corresponding account in the server 130, in which the personal data may include business card information (including a name, a phone number, a company, position information, an email address, a QQ number etc.), an image, application data (including short message data, a call log, third-party application data etc.) etc.

Figure 2:
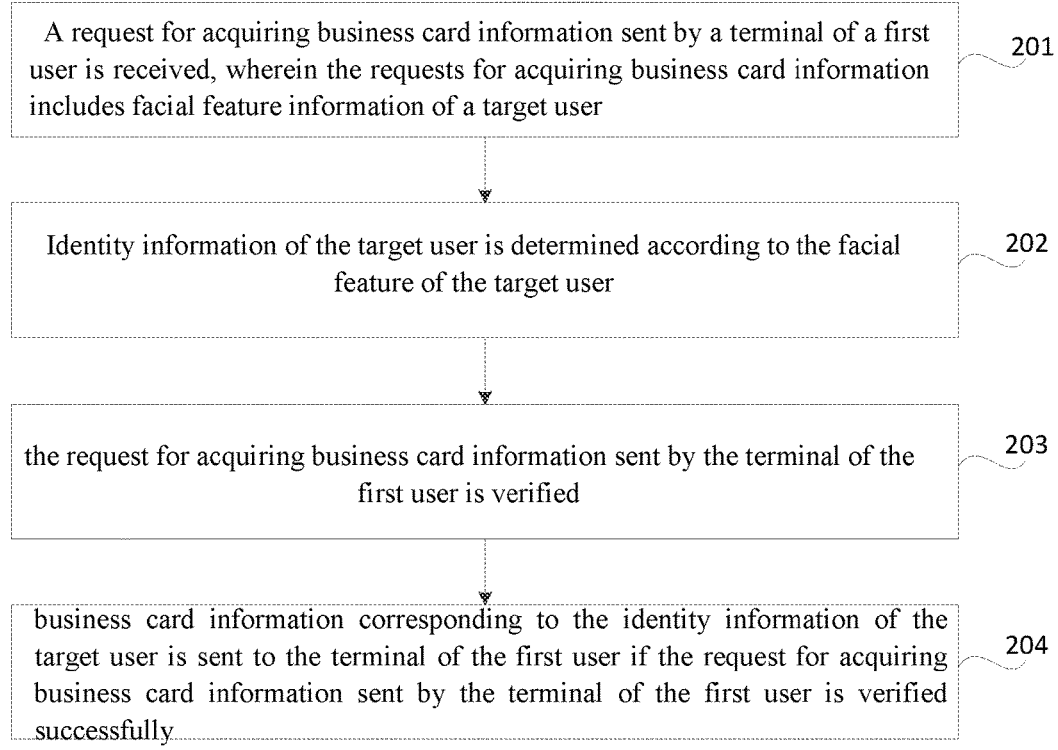
FIG. 2 is a flow chart of a method for acquiring business card information according to an example embodiment of the present disclosure.

FIG. 2 is a flow chart of a method for acquiring business card information according to an example embodiment of the present disclosure, in which the method may be applied to a server, such as the server 130 shown in FIG. 1. As shown in FIG. 2, the method may include the followings.

In act S201, a request for acquiring business card information sent by a terminal of a first user is received, and the request for acquiring business card information includes facial feature information of a target user.

The terminal of the first user (such as the first terminal 110 shown in FIG. 1) may send the request for acquiring business card information to a server so as to request business card information of the target user. The request for acquiring business card information may include facial feature information of the target user. The terminal of the first user may acquire the facial feature information (for example, in a form of a vector) of the target user by performing an image processing on the facial image of the target user. In an implementation, the terminal of the first user may take a picture of the target user for acquiring the facial image of the target user. In other implementations, the terminal of the first user may acquire the facial image of the target user from images stored locally, or receive the facial image of the target user from a terminal of the target user, and so on. The method for acquiring the facial image of the target user by the terminal of the first user is not limited in the present disclosure.

In act S202, identity information of the target user is determined according to the facial feature information of the target user.

A server may create a unique corresponding account for each registered user. A registered user may upload his or her personal data to the server through a terminal device, and the personal data includes a facial image, business card information, application data etc. In this way, the account information and the corresponding personal data of each registered user may be stored in the server. In addition, the server may determine facial image information of each registered user according to the facial image uploaded by each registered user. For example, the facial image information of each registered user may be acquired by performing an image processing on the facial image uploaded by each registered user. The server may store the facial image information of a registered user in the account of the registered user thereafter.

In this way, after the request for acquiring business card information that includes the facial feature information of the target user is received, the server may traverse a first facial feature information set and judge whether facial feature information matching with the facial feature information of the target user is included in the first facial feature information set, and the first facial feature information set may include facial feature information of all registered users. For example, a traversal may be conducted in the first facial feature information set, and a similarity matching is performed one by one on the facial feature information of the target user and each piece of facial feature information in the first facial feature information set. It is judged whether there is facial feature information whose similarity is higher than a preset threshold. If yes, this facial feature information may be used as the facial feature information matching with the facial feature information of the target user.

After that, if it is determined that the facial feature information matching with the facial feature information of the target user is included in the first facial feature information set, the identity information of the registered user corresponding to the matched facial feature information may be determined as the identity information of the target user. The identity information of the registered user, for example, may be account information of the registered user on the server.

In other words, the server may determine which business card information the user desires to acquire through the act S202.

In act S203, the request for acquiring business card information sent by the terminal of the first user is verified. The purpose of verifying the request for acquiring business card information is to determine whether the object to which the request for acquiring business card information is directed (i.e., target user) allows the first user to acquire the business card information. Thus, the security of business card information may be ensured.

In an alternative implementation, for example, if the identity information of the target user determined after the act S202 indicates that the target user is a second user, the request for acquiring business card information sent by the terminal of the first user may be verified in the following ways.

Firstly, the server sends a confirmation request to a terminal of the second user (such as the second terminal 120 shown in FIG. 1), and the confirmation request may be used for asking the second user to determine whether the request for acquiring business card information sent by the terminal of the first user is allowed. The second user may conduct a confirmation operation on the confirmation request through the terminal and the terminal may send a confirmation response to the server after the confirmation operation is conducted. After that, the server may receive the confirmation response sent by the terminal of the second user, and determine that the request for acquiring business card information sent by the terminal of the first user is verified successfully if it is determined that the confirmation response indicates that the second user allows the request for acquiring business card information sent by the terminal of the first user, i.e., the target user (i.e. the second user) allows the first user to acquire the business card information.

In act S204, if the request for acquiring business card information sent by the terminal of the first user is verified successfully, business card information corresponding to the identify information of the target user is sent to the terminal of the first user.

The business card information corresponding to each registered user may be pre-stored in the server. In this way, when the identity information of the target user is determined and the request for acquiring business card information with regard to the target user is successfully (the verification of the request passes), the business card information of the target user may be extracted by the server, and the business card information may be sent to and stored in the terminal of the first user.

Thus, a request for acquiring business card information that includes facial feature information of a target user is sent to a server by a terminal, and the server may determine identity information of the target user according to the facial feature information of the target user and verify the request for acquiring business card information. When the request for acquiring business card information is verified successfully, the business card information corresponding to the identity information of the target user may be sent to the terminal. Thus, it avoids the inconvenience caused by the operation of inputting business card information manually or acquiring business card information by scanning a two-dimensional code, thereby automatically acquiring information of the other's business card through the other's facial image may without geographical restriction, and even though both parties who exchange business card information are located remotely with each other, it allows users to conveniently exchange business card information.

As mentioned above, when the identity information of a target user is determined according to the facial feature information of the target user, the facial feature information of all registered users may be traversed, so as to acquire the facial feature information matching with the facial feature information of the target user. However, in a circumstance where there are too many registered users, this traversing method may lead to a low searching speed, and more than one piece of facial feature information matching with the facial feature information of the target user may be acquired if the faces of two or more registered users are similar. Thus, the server is unable to accurately determine the identity of the target user and know whose business card information the first user desires to acquire.

Figure 3A:
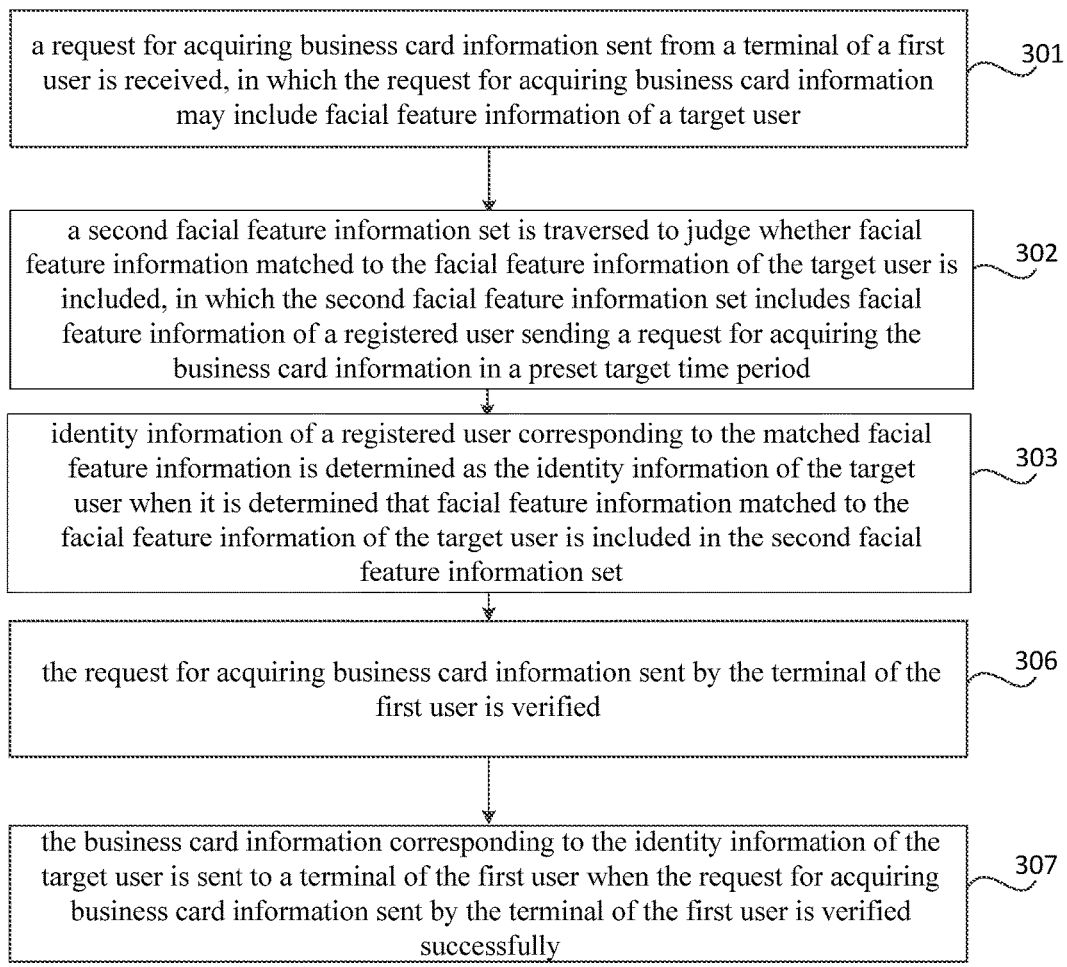
FIG. 3A and FIG. 3B are flow charts of a method for acquiring business card information according to another example embodiment of the present disclosure.
Figure 3B:
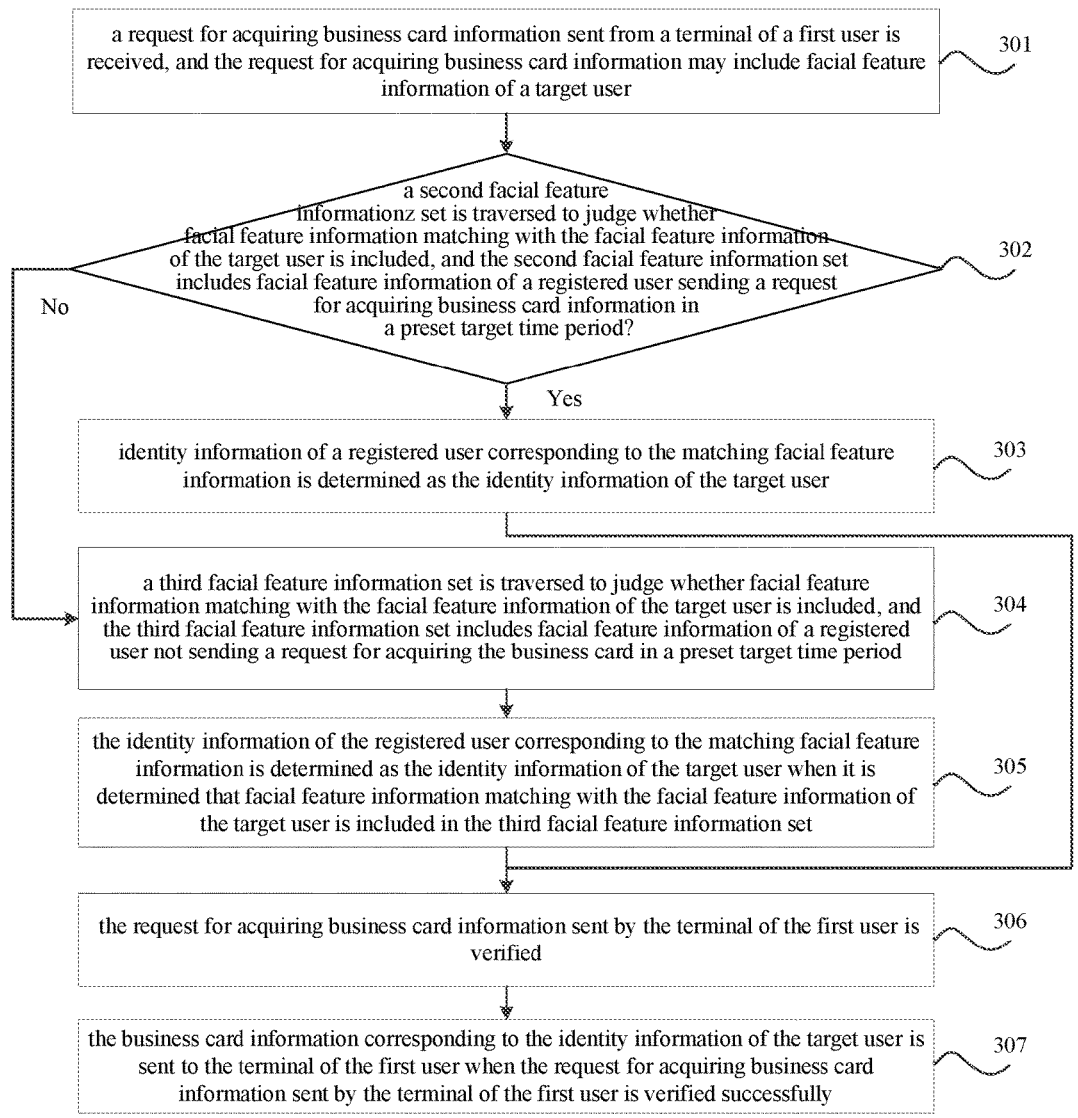

In response, in another embodiment of the present disclosure, a method for acquiring business card information is provided. FIG. 3A and FIG. 3B are flow charts of a method for acquiring business card information according to this example embodiment of the present disclosure. The method may be applied to a server, such as the server 130 shown in FIG. 1. As shown in FIG. 3A, the method may include the followings.

In act S301, a request for acquiring business card information sent from a terminal of a first user is received, and the request for acquiring business card information includes facial feature information of a target user.

In act S302, a second facial feature information set is traversed to judge whether facial feature information matching with the facial feature information of the target user is included, and the second facial feature information set includes facial feature information of a registered user sending a request for acquiring business card information in a preset target time period.

The server may receive requests for acquiring business card information from terminals of more than one user. As mentioned above, account of each registered user may be created in the server. In this way, after a user sends a request for acquiring business card information to the server through a terminal, the server may acquire the identity of the user through the account information of the user. In addition, after the server receives a request for acquiring business card information from a terminal of a user, the server may set a target time period according to the time when the request for acquiring business card information is acquired. For example, a time interval (such as one minute or two minutes) may be preset so that the time interval between the end time and the start time of the target time period is the preset time interval. The time when the request for acquiring business card information is received may be either an end time of the target time period, a start time of the target time period, or a middle time of the target time period. In an example implementation, the target time period may be established with the time 30 s before the time when the request for acquiring business card information is received as the beginning and the time 30 s after the time when the request for acquiring business card information is received as the ending.

When acquiring business card information, there might be a circumstance where the two sides exchange their business cards. Under this circumstance, the both sides may send requests for acquiring business card information to a server through respective terminals, and the difference between the two sending time points is not much. Thus, a target time period may be set according to the above method. In this way, after the server receives a request from a user for acquiring business card information of the target user, the server may prioritize a traversal among the facial feature information of registered users who send requests for acquiring business card information to the server within the target time period, since the target user may also send a request for acquiring business card information to the server within this target time period. Thus, the searching time may be reduced significantly as compared with conducting a traversal among the facial feature information of all the registered users. In addition, the possibility of traversing similar faces may be reduced, so as to ensure that the identity information of the target user may be determined accurately.

In act S303, when it is determined that the facial feature information matching with the facial feature information of the target user is included in the second facial feature information set, identity information of a registered user corresponding to the matched facial feature information is determined as the identity information of the target user.

Alternatively, as shown in FIG. 3B, in act S304, when it is determined that the facial feature information matching with the facial feature information of the target user is not included in the second facial feature information set, a third facial feature information set is traversed to judge whether the facial feature information matching with the facial feature information of the target user is included. The third facial feature information set includes facial feature information of a registered user not sending a request for acquiring business card information in a preset target time period.

In other words, if the facial feature information matching with the facial feature information of the target user is not found in the second facial feature information set, the server may also judge whether the facial feature information matching with the facial feature information of the target user is included by traversing facial feature information of other registered users (i.e. the registered users who do not send a request for acquiring business card information within the target time period).

In act S305, when it is determined that the facial feature information matching with the facial feature information of the target user is included in the third facial feature information set, the identity information of the registered user corresponding to the matching facial feature information is determined as the identity information of the target user.

In addition, as shown in FIG. 3A and FIG. 3B, the method also includes the followings.

In act S306, the request for acquiring business card information sent by the terminal of the first user is verified.

In act S307, when the request for acquiring business card information sent by the terminal of the first user is verified successfully, the business card information corresponding to the identity information of the target user is sent to the terminal of the first user.

By this implementation, the searching time of the server may be reduced significantly and the searching speed may be improved. In addition, the possibility of traversing similar faces may be reduced, so as to ensure that the identity information of the target user may be determined accurately by the server, so that the process of acquiring business card information may be accelerated.

Figure 4A:
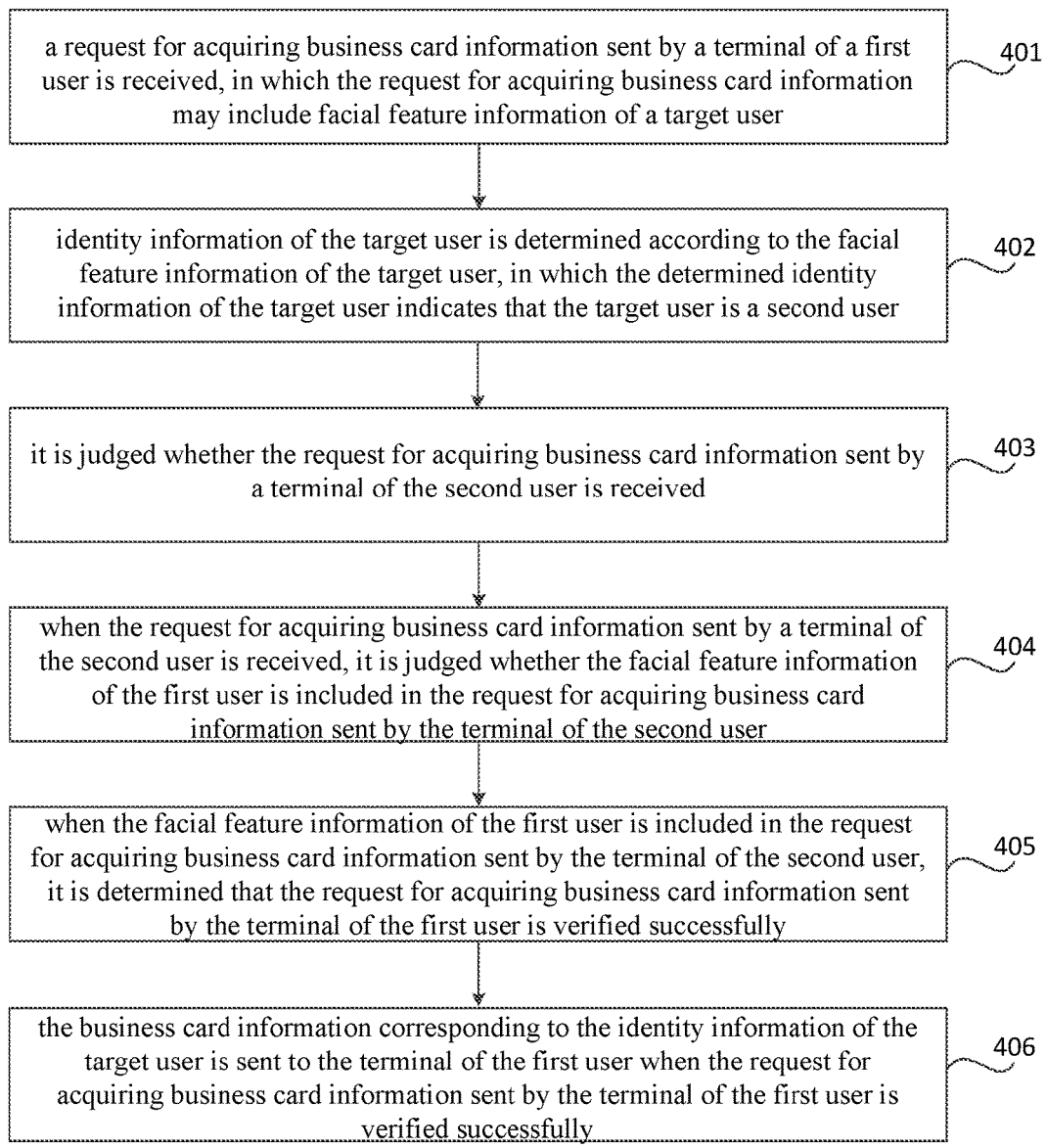
FIG. 4A and FIG. 4B are flow charts of a method for acquiring business card information according to yet another example embodiment of the present disclosure.
Figure 4B:
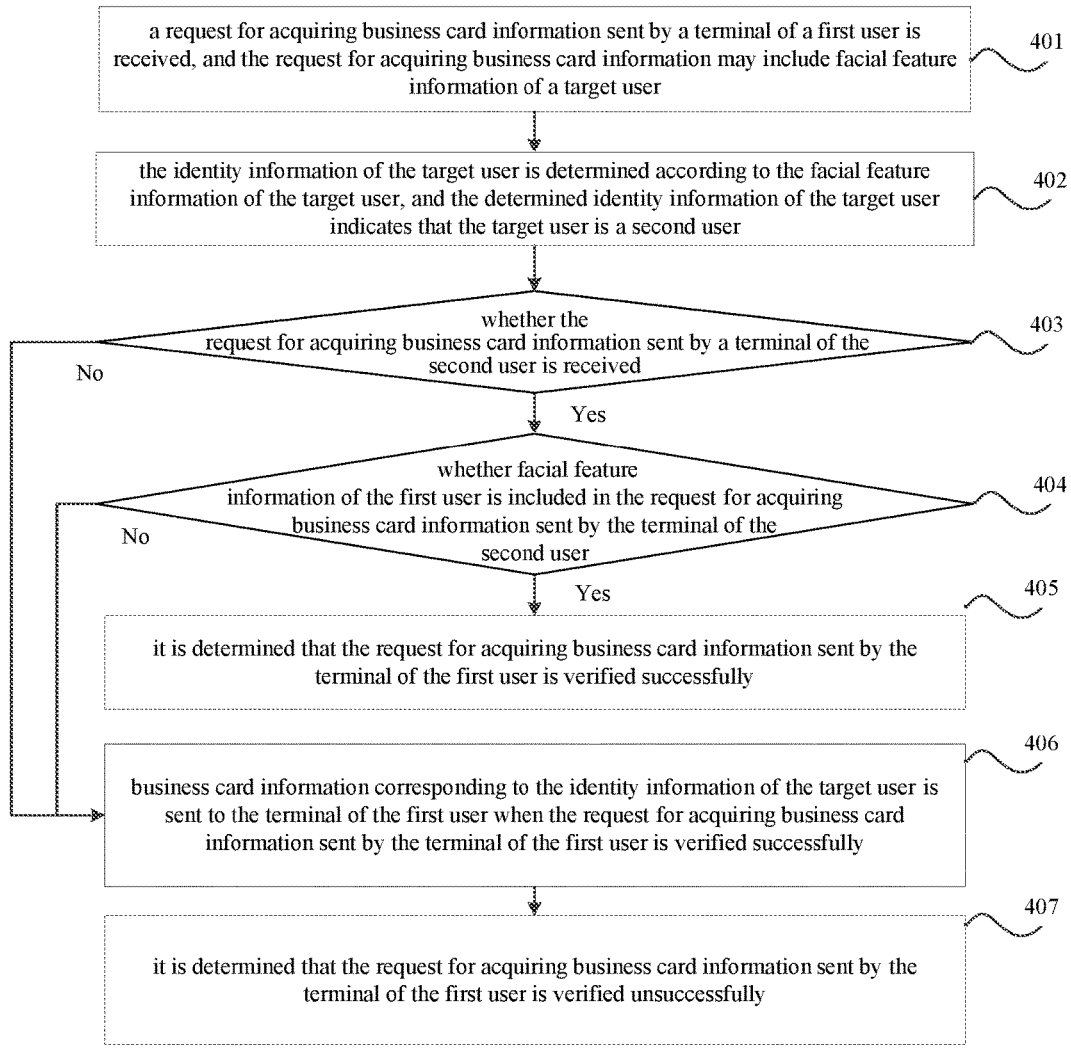

As mentioned above, when acquiring business card information, there might be a circumstance where the two sides exchange their business cards. In order to bring operation convenience to a user under this circumstance, another method for acquiring business card information is provided in the present disclosure. FIG. 4A and FIG. 4B are flow charts of a method for acquiring business card information according to this example embodiment of the present disclosure. The method is applied to a server, such as the server 130 shown in FIG. 1. As shown in FIG. 4, the method may include the followings.

In act S401, a request for acquiring business card information sent by a terminal of a first user is received, and the request for acquiring business card information may include facial feature information of a target user.

In act S402, identity information of the target user is determined according to the facial feature information of the target user. For example, the determined identity information of the target user indicates that the target user is a second user.

In act S403, it is judged whether the request for acquiring business card information sent by a terminal of the second user is received.

The server may determine the identity of each sender according to the account information of each sender sending the request for acquiring business card information, and determine whether there is the request for acquiring business card information sent by the second user.

In act S404, when the request for acquiring business card information sent by a terminal of the second user is received, it is judged whether facial feature information of the first user is included in the request for acquiring business card information sent by the terminal of the second user.

In the request for acquiring business card information sent by a terminal of each user, the facial feature information of the intended target user may be included. When the server receives the request for acquiring business card information sent by a terminal of the second user, the server may compare the facial feature information of the target user in this request for acquiring business card information with the facial feature information of the first user, so as to judge whether they match with each other. When they match with each other, the server may determine that the facial feature information of the first user is included in the request for acquiring business card information sent by the terminal of the second user, which means that the second user may also request the business card information of the first user. At this moment, it is the circumstance where the two sides exchange their business cards.

In act S405, when the facial feature information of the first user is included in the request for acquiring business card information sent by the terminal of the second user, it is determined that the request for acquiring business card information sent by the terminal of the first user is verified successfully. In other words, as long as it is determined as the circumstance where the two sides exchange their business cards, it may be determined that the request for acquiring business card information sent by the terminal of the first user is verified successfully, which means that the business card information of the second user is allowed to be acquired.

In act S406, when the request for acquiring business card information sent by the terminal of the first user is verified successfully, the business card information corresponding to the identity information of the target user is sent to the terminal of the first user. In other words, the business card information of the second user may be sent to the terminal of the first user.

Because it is the circumstance where the two sides exchange their business cards, when a request for acquiring business card information sent by one side is verified successfully by the server, a request for acquiring business card information sent by the other side may be verified by the server automatically. Under this circumstance, the method may also include: when the request for acquiring business card information received by the terminal of the first user is verified successfully, the business card information may be sent to the terminal of the second user so as to realize an exchange of the business card information of the both sides.

Alternatively, as shown in FIG. 4B, the method may also include the followings.

In act S407, when the request for acquiring business card information sent by the terminal of the second user is not received, or when the facial feature information of the first user is not included in the request for acquiring business card information sent by the terminal of the second user, it is determined that the request for acquiring business card information sent by the terminal of the first user is verified unsuccessfully. At this moment, the server may not permit the request for acquiring business card information, which means that the business card information of the second user may not be sent to the terminal of the first user.

By this implementation, when the both sides request the business card information of the other side, the request for acquiring business card information may be permitted by the server without manual confirmations from the both sides, so as to bring convenience for a user. In addition, the business card information is allowed to be acquired only when the both sides request the business card information of the other side, thus, the security of acquiring business card information may be ensured and the user's privacy is protected.

Figure 5A:
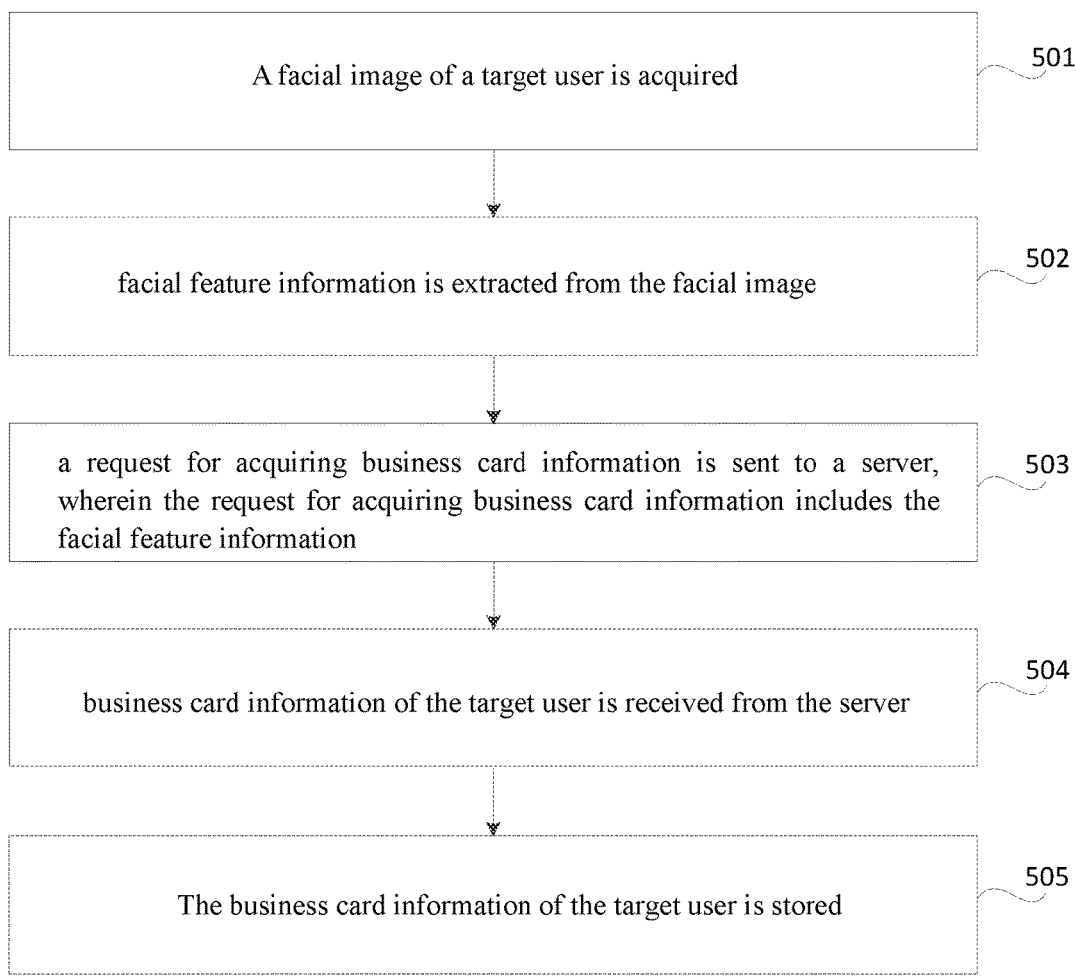
FIG. 5A and FIG. 5B are flow charts of a method for acquiring business card information according to an example embodiment of the present disclosure.
Figure 5B:
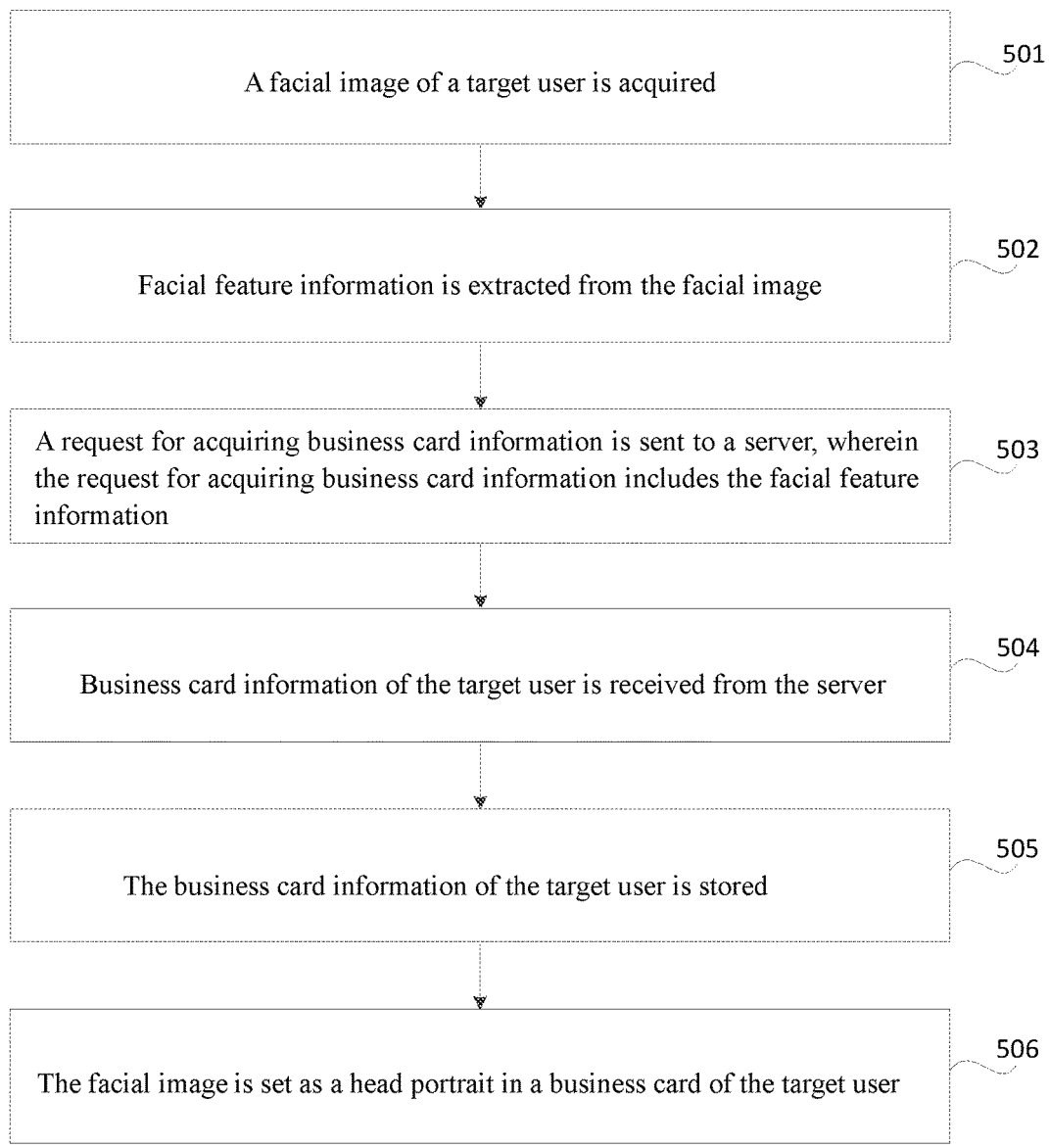

FIG. 5A and FIG. 5B are flow charts of a method for acquiring business card information according to an example embodiment of the present disclosure. The method is applied to a terminal, such as the first terminal 110 or the second terminal 120 shown in FIG. 1. As shown in FIG. 5A, the method may also include the followings.

In act S501, a facial image of a target user is acquired.

For example, as a requester, the user may acquire the facial image of the target user by taking a picture of the target user with the terminal; or the user may acquire the facial image of the target user from images stored locally in the terminal; or the user may receive the facial image of the target user from a terminal of the target user through his/her terminal, and so on.

In act S502, facial feature information is extracted from the facial image. For example, the terminal may acquire the facial feature information (for example, in a form of a vector) of the target user by performing an image processing on the facial image of the target user.

In act S503, a request for acquiring business card information that includes the facial feature information is sent to a server.

After the server receives the request for acquiring business card information that includes the facial feature information from a terminal, identity of the target user may be determined and the request for acquiring business card information may be verified according to any of methods shown in FIG. 2 to FIG. 4B. Under the circumstance where the request for acquiring business card information is verified successfully by the server (i.e., passing the verification performed by the server), the server may send the business card information of the target user to the terminal.

In act S504, business card information of the target user is received from the server.

In act S505, the business card information of the target user is stored. Thus, the process of acquiring business card information is finished.

Thus, a request for acquiring business card information that includes facial feature information of a target user is sent to a server by a terminal, the server may determine identity information of the target user according to the facial feature information of the target user and verify the request for acquiring business card information. When the request for acquiring business card information is verified successfully, the business card information corresponding to the identity information of the target user may be sent to the terminal. Thus, it avoids the inconvenience caused by the operation of inputting business card information manually or acquiring business card information by scanning a two-dimensional code may be solved, and thereby automatically acquiring the information of the other's business card through the other's facial image without any geographical restriction, and even though both parties who exchange business card information are located remotely with each other, it allows users to conveniently exchange business card information.

In an alternative implementation, as shown in FIG. 5B, the method may also include: in act S506, the facial image acquired in act S501 may be set as a head portrait in a business card of the target user. Thus, it is unnecessary to generate a corresponding head portrait for the business card of the target user, so that the operation of setting head portrait may be saved, thus further improving the users' experience while bring convenience for users.

Figure 6A:
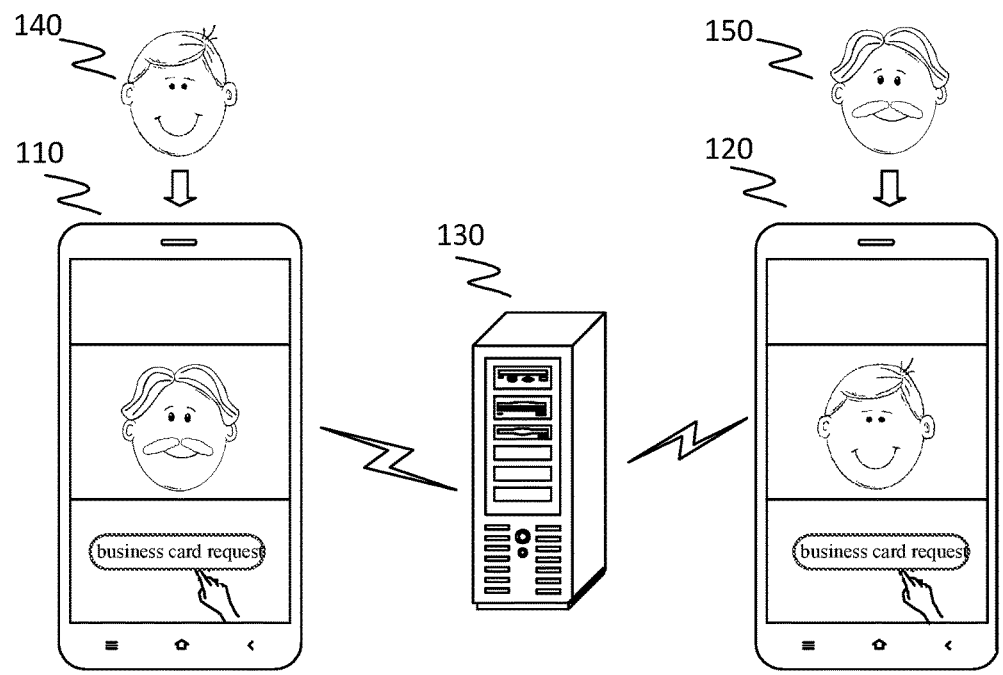
FIG. 6A to FIG. 6B are diagrams of a scenario in which the method for acquiring business card information provided by the present disclosure is implemented.
Figure 6B:
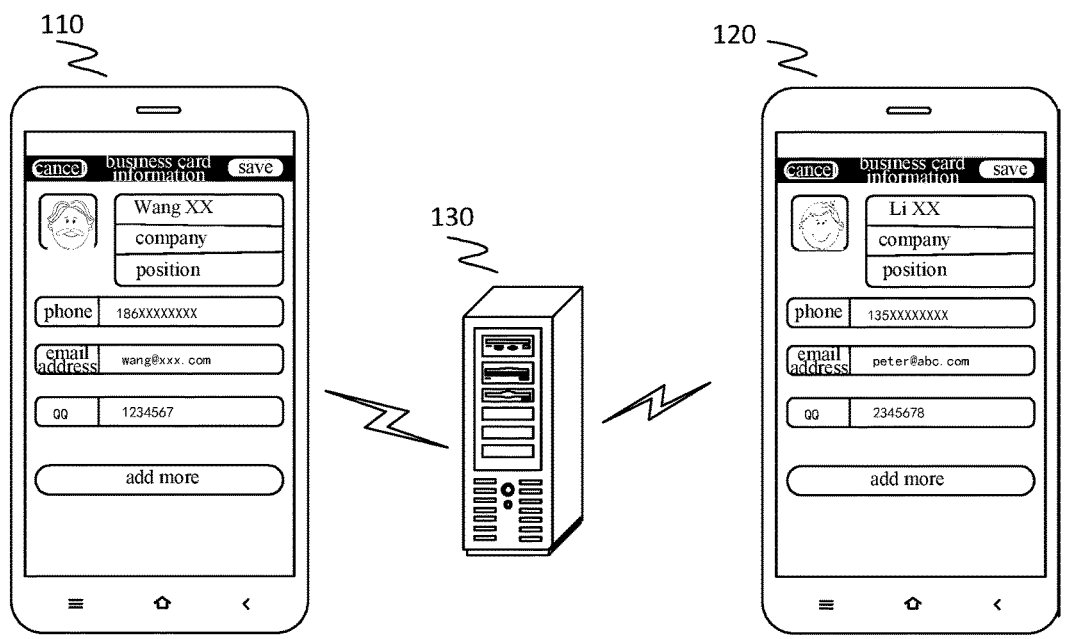

FIG. 6A to FIG. 6B are schematic diagrams of a scenario for implementing the method for acquiring business card information provided by the present disclosure. As shown in FIG. 6A, a first user 140 takes a picture of a face of a second user 150 through a first terminal 110. At the same time, the second user 150 takes a picture of a face of a first user 140 through a second terminal 120. After that, the first user 140 sends a request for acquiring business card information (for example, by clicking a "business card requesting" button) to a server 130 through the first terminal 110, and the request for acquiring business card information includes facial feature information of the second user 150. At the same time, the second user 150 sends a request for acquiring business card information (for example, by clicking a "business card requesting" button) to the server 130 through the second terminal 120, and the request for acquiring business card information includes facial feature information of the first user 140. By processing the received two requests for acquiring the business card information, the server 130 permits the requests for acquiring business card information, and sends business card information of the first user 140 to the second terminal 120 of the second user 150, and sends business card information of the second user 150 to the first terminal 110 of the first user 140. As shown in FIG. 6B, the business card information of the second user 150 may be shown on the first terminal 110, and the business card information of the first user 140 may be shown on the second terminal 120. At this moment, the both sides may click the "save" button on the display interface of respective terminal so as to store the received business card information. In addition, the facial image of the other side shot previously may be set as a head portrait of his or her business card, such as that in a head portrait frame shown in FIG. 6B. Thus, a business card of the other side may be established in respective address list.

Figure 7A:
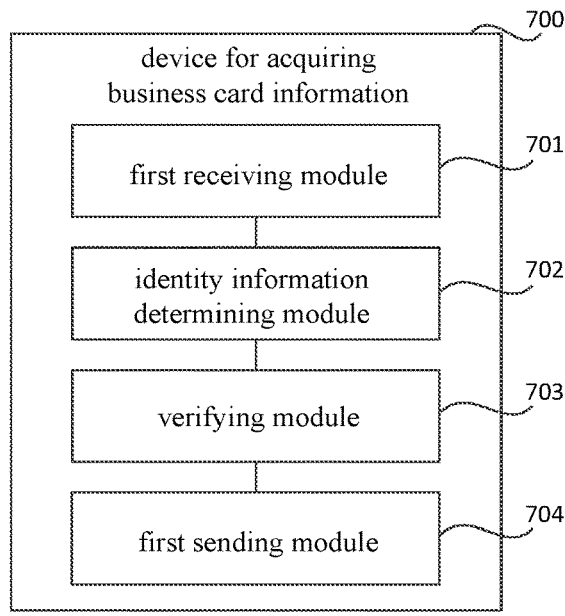

FIG. 7A to FIG. 7I are block diagrams of a device 700 for acquiring business card information according to an example embodiment of the present disclosure, and the device 700 is applied to a server, such as the server 130 shown in FIG. 1. As shown in FIG. 7A, the device 700 may include a first receiving module 701, configured to receive a request for acquiring business card information sent by a terminal of a first user, and the request for acquiring business card information includes facial feature information of a target user.

The terminal of a first user (such as the first terminal 110 shown in FIG. 1) may send a request for acquiring business card information to a server so as to request business card information of a target user. The request for acquiring business card information may include facial feature information of the target user. The terminal of a first user may require the facial feature information (for example, in a form of a vector) of the target user by performing an image processing on the facial image of the target user. In an implementation, the terminal of the first user may take a picture of the target user for acquiring the facial image of the target user. In other implementations, the terminal of the first user may acquire the facial image of the target user from images stored locally, or receive the facial image of the target user from the terminal of the target user, and so on. The method for acquiring a facial image of the target user by a terminal of a first user is not limited in the present disclosure.

Additionally, as shown in FIG. 7A, the device 700 may include an identity information determining module 702, configured to determine identity information of the target user according to the facial feature information of the target user received by the first receiving module 701. The identity information of a registered user, for example, may be account information of the registered user on a terminal. In other words, which business card information the first user desires to acquire may be determined by the identity information determining module 702.

Additionally, as shown in FIG. 7A, the device 700 may include a verifying module 703, configured to verify the request for acquiring business card information received by the first receiving module 701. The purpose of verifying the request for acquiring business card information is to determine whether the object to which the request for acquiring business card information is directed (i.e. a target user) allows the first user to acquire the business card information. Thus, the security of business card information may be ensured.

Additionally, as shown in FIG. 7A, the device 700 may include a first sending module 704, configured to send business card information corresponding to the identity information of the target user to the terminal of the first user if the verifying module 703 determines that the request for acquiring business card information received by first receiving module 701 is verified successfully. For example, the business card information corresponding to each registered user may be pre-stored in the server. In this way, when the identity information of the target user is determined and the request for acquiring business card information aimed at the target user is verified successfully, the first sending module 704 may extract the business card information of the target user, and send the business card information to the terminal of the first user so as to be stored in this terminal of the first user.

Thus, a request for acquiring business card information that includes facial feature information of a target user is sent to a server by a terminal, and the server may determine identity information of the target user according to the facial feature information of the target user and verify the request for acquiring business card information. When the request for acquiring business card information is verified successfully, the business card information corresponding to the identity information of the target user may be sent to the terminal. Thus, it avoids the inconvenience caused by the operation of of inputting business card information manually or acquiring business card information by scanning a two-dimensional code, and thereby automatically acquiring information of the other's business card through the other's facial image without any geographical restriction, and even though both parties who exchange business card information are located remotely with each other, it allows users to conveniently exchange business card information.

Figure 7B:
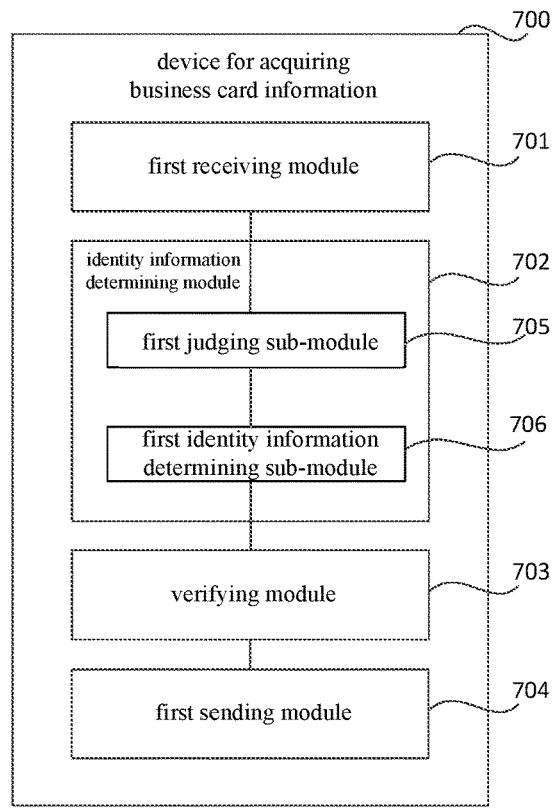

Alternatively, as shown in FIG. 7B, the identity information determining module 702 may include a first judging sub-module 705, configured to traverse a first facial feature information set and to judge whether facial feature information matching with the facial feature information of the target user is included in the first facial feature information set, and the first facial feature information set includes facial feature information of all registered users. For example, the first judging sub-module 705 may conduct a traversal in the first facial feature information set, and perform a similarity matching one by one on the facial feature information of the target user and each piece of facial feature information in the first facial feature information set, and judge whether there is facial feature information whose similarity is higher than a preset threshold. If yes, this facial feature information may be treated as the facial feature information matching with the facial feature information of the target user.

Additionally, as shown in FIG. 7B, the identity information determining module 702 may also include a first identity information determining sub-module 706, configured to determine identity information of a registered user corresponding to the facial feature information matching with the facial feature information of the target user as the identity information of the target user if it is determined by the first judging sub-module 705 that the facial feature information matching with the facial feature information of the target user is included in the first facial feature information set.

In the implementation shown in FIG. 7B, when the identity information of a target user is determined according to the facial feature information of the target user, the facial feature information of all registered users may be traversed, so as to acquire the facial feature information matching with the facial feature information of the target user. However, in a circumstance where there are too many registered users, this traversing method may lead to a low searching speed, and more than one piece of facial feature information matching with the facial feature information of the target user may be acquired if the faces of two or more registered users are similar. Thus, the identity information determining module 702 is unable to determine the identity of the target user accurately and know whose business card the first user desires to acquire.

As shown in FIG. 7C, the identity information determining module 702 may include: a second judging sub-module 707, configured to traverse a second facial feature information set and to judge whether facial feature information matching with the facial feature information of the target user is included in the second facial feature information set, and the second facial feature information set includes facial feature information of a registered user sending a request for acquiring business card information in a preset target time period.

For example, the server may receive requests for acquiring business card information from terminals of more than one user. As mentioned above, account of each registered user may be created in the server. In this way, after a user sends a request for acquiring business card information to the server through a terminal, the server may acquire the identity of the user through the account information of the user. In addition, after the server receives a request for acquiring business card information from a terminal of a user, the server may set a target time period according to the time when the request for acquiring business card information is acquired. For example, a time interval (such as one minute or two minutes) may be preset so that the time interval between the end time and the start time of the target time period is the preset time interval. The time when the request for acquiring business card information is received may be either an end time of the target time period, a start time of the target time period, or a middle time of the target time period. In an example implementation, the target time period may be established with the time 30 s before the time when the request for acquiring business card information is received as the beginning and the time 30 s the time when after the request for acquiring business card information is received as the ending.

When acquiring business card information, there might be a circumstance where the two sides exchange their business cards. Under this circumstance, the both sides may send requests for acquiring business card information to a server through respective terminals, and the difference between the two sending time points is not much. Thus, a target time period may be set according to the above method. In this way, after the server receives a request from a user for acquiring business card information of the target user, the server may prioritize a traversal among the facial feature information of registered users who send requests for acquiring business card information to the server within the target time period, since the target user may also send a request for acquiring business card information to the server within this target time period. Thus, the searching time may be reduced significantly as compared with conducting a traversal among the facial feature information of all the registered users. In addition, the possibility of traversing similar faces may be reduced, so as to ensure that the identity information of the target user may be determined precisely.

Additionally, as shown in FIG. 7C, the identity information determining module 702 may also include: a second identity information determining sub-module 708, configured to determine the identity information of the registered user corresponding to the facial feature information matching with the facial feature information of the target user as the identity information of the target user if it is determined by the second judging sub-module 707 that the facial feature information matching with the facial feature information of the target user is included in the second facial feature information set.

Alternatively, as shown in FIG. 7D, the identity information determining module 702 may also include: a third judging sub-module 709, configured to traverse a third facial feature information set and to judge whether the facial feature information matching with the facial feature information of the target user is included in the third facial feature information set if it is determined by the second judging sub-module 707 that the facial feature information matching with the facial feature information of the target user is not included in the second facial feature information set, and the third facial feature information set includes facial feature information of a registered user not sending a request for acquiring business card information in a preset target time period. In other words, if the facial feature information matching with the facial feature information of the target user is not found in the second facial feature information set, the server may also judge whether the facial feature information matching with the facial feature information of the target user is included by traversing facial feature information of other registered users (i.e. the registered users who do not send the request for acquiring business card information within the target time period).

Additionally, as shown in FIG. 7D, the identity information determining module 702 may also include: a third identity information determining sub-module 710, configured to determine the identity information of the registered user corresponding to the facial feature information matching with the facial feature information of the target user as the identity information of the target user if it is determined by the third judging sub-module 709 that the facial feature information matching with the facial feature information of the target user is included in the third facial feature information set.

Figure 7E:
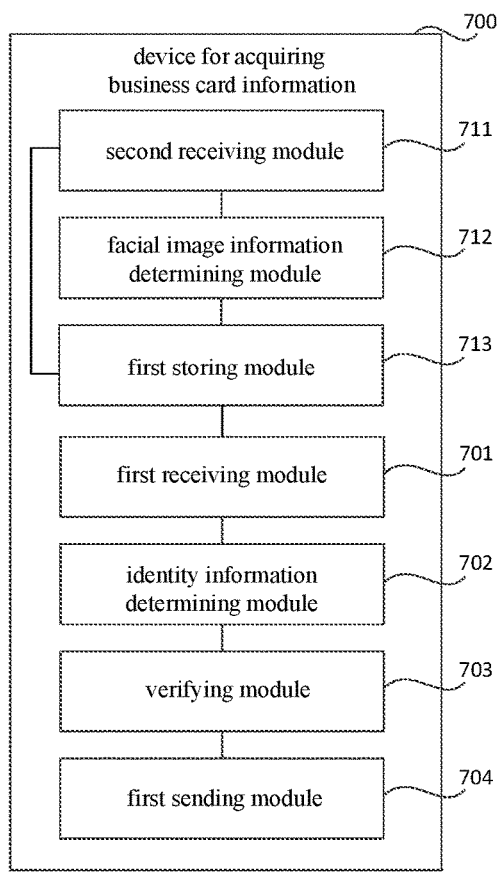

Alternatively, as shown in FIG. 7E, the device 700 may also include: a second receiving module 711, configured to receive a facial image and business card information uploaded by each registered user before the request for acquiring business card information sent by the terminal of the first user is received by the first receiving module; a facial image information determining module 712, configured to determine facial image information of each registered user according to the facial image uploaded by each registered user and received by the second receiving module 711; a first storing module 713, configured to store the facial image information of each registered user determined by the facial image information determining module 712 and the business card information uploaded by each registered user and received by the second receiving module 711.

For example, a server may create a unique corresponding account for each registered user. A registered user may upload his or her personal data to a server through a terminal device, and the personal data includes a facial image, business card information, application data etc. In this way, the account information and the corresponding personal data of each registered user may be stored in the server. In addition, the server may determine the facial image information of each registered user according to the facial image uploaded by each registered user. For example, the facial image information of each registered user may be acquired by performing an image processing on the facial image uploaded by each registered user. The server may store the facial image information of a registered user in the account of the registered user thereafter.

Figure 7F:
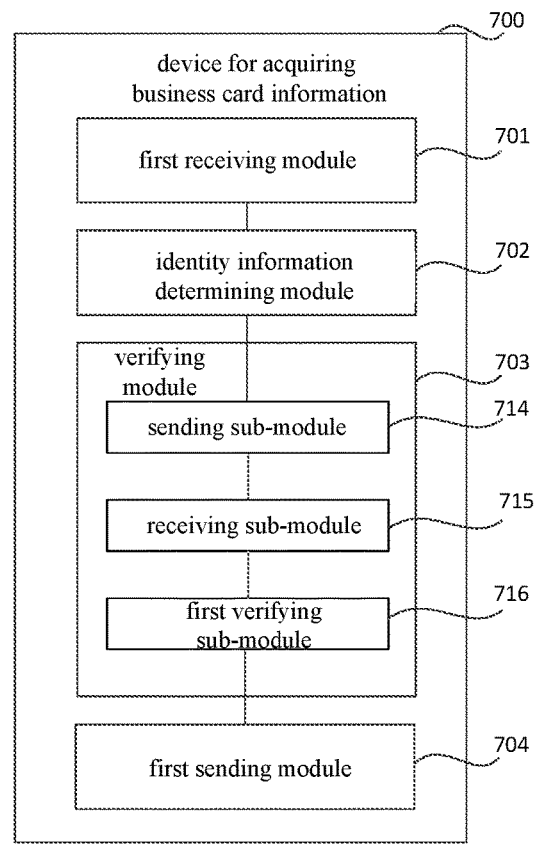

Alternatively, the determined identity information indicates that the target user is a second user. Under this circumstance, as shown in FIG. 7F, the verifying module 703 may include a sending sub-module 714, configured to send a confirmation request to a terminal of the second user (such as the second terminal 120 shown in FIG. 1), the confirmation request is used for asking the second user to determine whether the request for acquiring business card information received by the first receiving module 701 is allowed. The second user may conduct a confirmation operation on the confirmation request through the terminal and the terminal may send a confirmation respond to the server after the confirmation operation is conducted. As shown in FIG. 7F, the verifying module 703 may also include a receiving sub-module 715, configured to receive a confirmation response sent by the terminal of the second user; and a first verifying sub-module 716, configured to determine that the request for acquiring business card information received by the first receiving module 701 is verified successfully if the confirmation response received by the receiving sub-module indicates that the request for acquiring business card information received by the first receiving module 701 is allowed by the second user, i.e., the target user (i.e. the second user) allows the first user to acquire the information of his or her business card.

As mentioned above, when acquiring business card information, there might be a circumstance where the two sides exchange their business cards. In order to provide operation convenience to a user under this circumstance, alternatively, as shown in FIG. 7G the verifying module 703 includes: a fourth judging sub-module 717, configured to judge whether a request for acquiring business card information sent by the terminal of the second user is received. For example, the identity of each sender may be determined according to the account information of each sender of the request for acquiring business card information, and it may be determined whether there is the request for acquiring business card information sent by the second user.

Additionally, as shown in FIG. 7G the verifying module 703 may also include a fifth judging sub-module 718, configured to judge whether facial feature information of the first user is included in the request for acquiring business card information sent by the terminal of the second user if the fourth judging sub-module 717 determines that the request for acquiring business card information sent by the terminal of the second user is received.

In the request for acquiring business card information sent by a terminal of each user, the facial feature information of the intended target user may be included. When the server receives the request for acquiring business card information sent by a terminal of the second user, the server may compare the facial feature information of the target user in the request for acquiring business card information with the facial feature information of the first user, so as to judge whether they match with each other. When they match with each other, the server may determine that the facial feature information of the first user is included in the request for acquiring business card information sent by the terminal of the second user, which means that the second user may also request the business card information of the first user. At this moment, it is the circumstance where the two sides exchange their business cards.

Additionally, as shown in FIG. 7Q the verifying module 703 may also include a second verifying sub-module 719, configured to determine that the request for acquiring business card information received by the first receiving module 701 is verified successfully if it is determined by the fifth judging sub-module 718 that the facial feature information of the first user is included in the request for acquiring business card information sent by the terminal of the second user. In other words, as long as it is determined as the circumstance where the two sides exchange their business cards, the second verifying sub-module 719 may determine that the request for acquiring business card information sent by the terminal of the first user is verified successfully, which means that the business card information of the second user is allowed to be acquired.

Additionally, as shown in FIG. 7H, the verifying module 703 may also include a third verifying sub-module 720, configured to determine that the request for acquiring business card information received by the first receiving module 701 is verified unsuccessfully if the fourth judging sub-module 717 determines that the request for acquiring business card information sent by the terminal of the second user is not received, or if the fifth judging sub-module 718 determines that the facial feature information of the first user is not included in the request for acquiring business card information sent by the terminal of the second user.

Figure 7I:
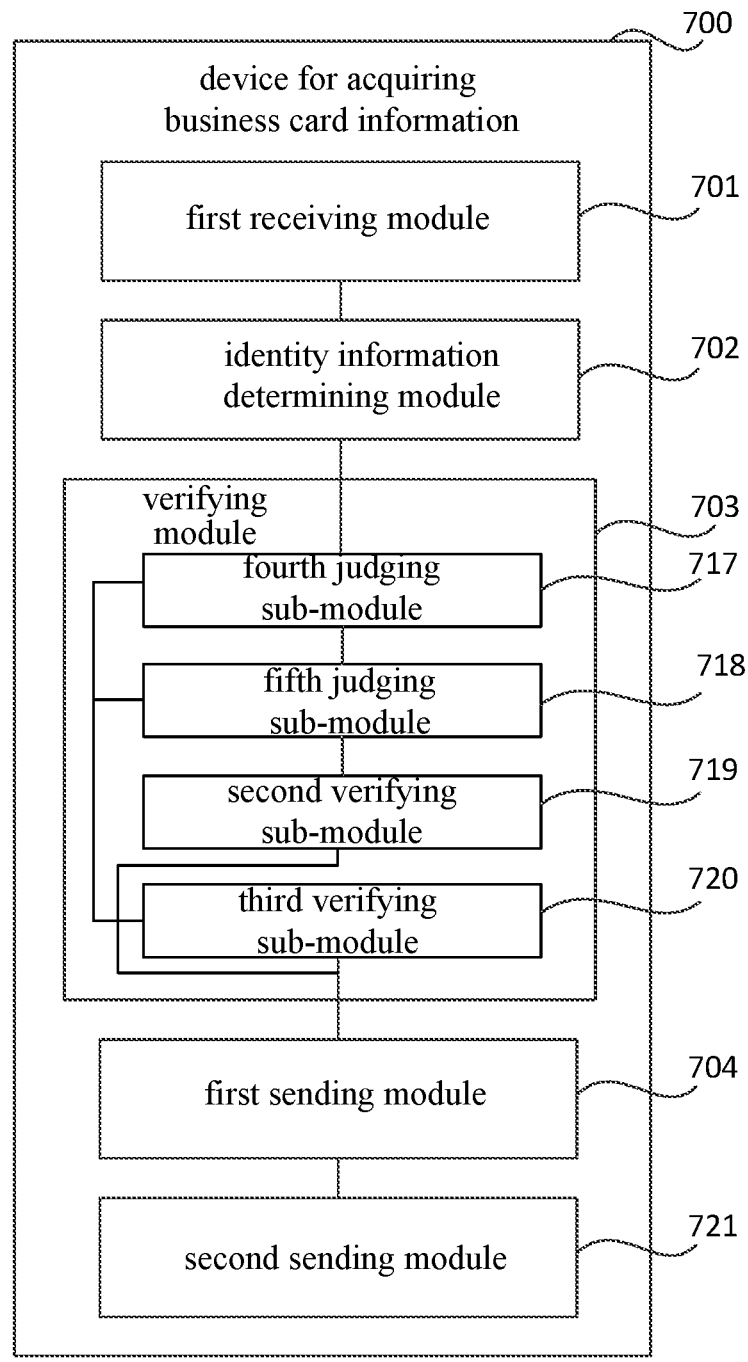

Because it is the circumstance where the two sides exchange their business cards, when a request for acquiring business card information sent by one side is verified successfully by the server, a request for acquiring business card information sent by the other side may be permitted by the server automatically. Thus, alternatively, as shown in FIG. 7I, the device 700 also includes: a second sending module 721, configured to send the information of the first user's business card to a terminal of the second user when the verifying module 703 determines that the request for acquiring business card information received by the first receiving module 701 is verified successfully, so as to realize an exchange of business card information of the two sides.

By this implementation, when the both sides request the business card information of the other side, the request for acquiring business card information may be permitted by the server without manual confirmations from the both sides, so as to provide convenience for a user. In addition, the business card information is allowed to be acquired only when the both sides request the business card information of the other side, thus, the security of acquiring business card information may be ensured and the user's privacy is protected.

Figure 8A:
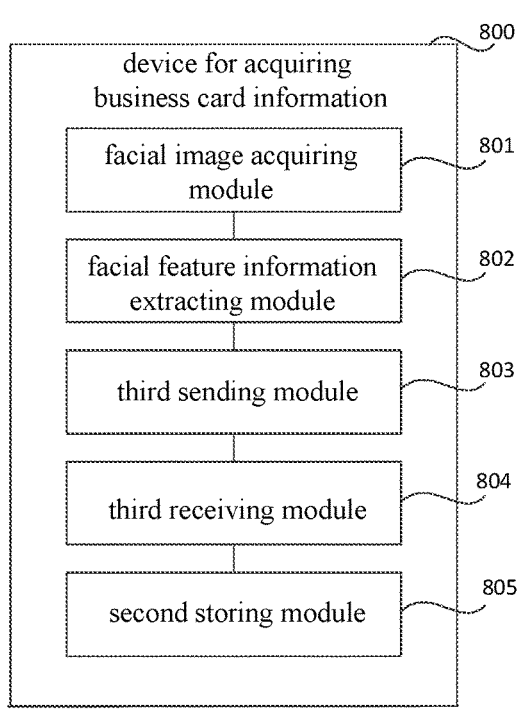
FIG. 8A and FIG. 8B are block diagrams of a device for acquiring business card information according to an example embodiment of the present disclosure.
Figure 8B:
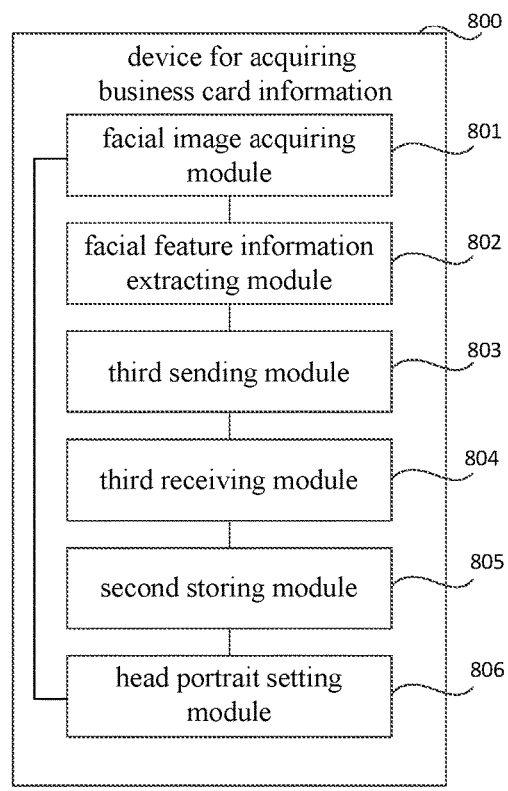

FIG. 8A and FIG. 8B are block diagrams of a device 800 for acquiring business card information according to an example embodiment of the present disclosure. The device 800 may be applied in a terminal, such as the first terminal 110 or the second terminal 120 shown in FIG. 1. As shown in FIG. 8A, the device 800 may include a facial image acquiring module 801, configured to acquire a facial image of a target user. For example, the facial image acquiring module 801 may take a picture of the target user for acquiring the facial image of the target user; or, the facial image acquiring module 801 may select the facial image of the target user from images stored locally; or, the facial image acquiring module 801 may receive the facial image of the target user from a terminal of the target user, and so on.

Additionally, as shown in FIG. 8A, the device 800 may also include a facial feature information extracting module 802, configured to extract facial feature information from the facial image acquired by the facial image acquiring module 801. For example, the facial feature information extracting module 802 may acquire the facial feature information (for example, in a form of a vector) of the target user by performing an image processing on the facial image of the target user.

Additionally, as shown in FIG. 8A, the device 800 may also include a third sending module 803, configured to send a request for acquiring business card information to a server, and the request for acquiring business card information includes the facial feature information extracted by the facial feature information extracting module 802. After the server receives the request for acquiring business card information that includes the facial feature information from a terminal, identity of the target user may be determined and the request for acquiring business card information may be verified according to any of methods shown in FIG. 2 to FIG. 4B. Under the circumstance where the request for acquiring business card information is verified successfully by the server, the server may send business card information of the target user to the terminal.

Additionally, as shown in FIG. 8A, the device 800 may also include a third receiving module 804, configured to receive business card information of the target user from the server; and a second storing module 805, configured to store the business card information of the target user received by the third receiving module 804. Thus, the process of acquiring business card information is finished.

Thus, a request for acquiring business card information that includes facial feature information of a target user is sent to a server by a terminal, the server may determine identity information of the target user according to the facial feature information of the target user and verify the request for acquiring business card information. When the request for acquiring business card information is verified successfully, the business card information corresponding to the identity information of the target user may be sent to the terminal. Thus, it avoids the inconvenience caused by the operation of inputting business card information manually or acquiring business card information by scanning a two-dimensional code, and thereby automatically acquiring information of the other's business card through the other's facial image without any geographical restriction, and even though both parties who exchange business card information are located remotely with each other, it allows users to conveniently exchange business card information.

Alternatively, as shown in FIG. 8B, the device 800 may also include: a head portrait setting module 806, configured to set the facial image acquired by the facial image acquiring module 801 as a head portrait in a business card of the target user. Thus, it is unnecessary to establish a corresponding head portrait for the business card of the target user, so that the operation of setting head portrait may be saved, thus further improving the users' experience while providing convenience for users.

As regards the device in the above embodiments, the specific method of executive operation of each module is described in detail in embodiments related to the method, and will not be described herein.

Figure 9:
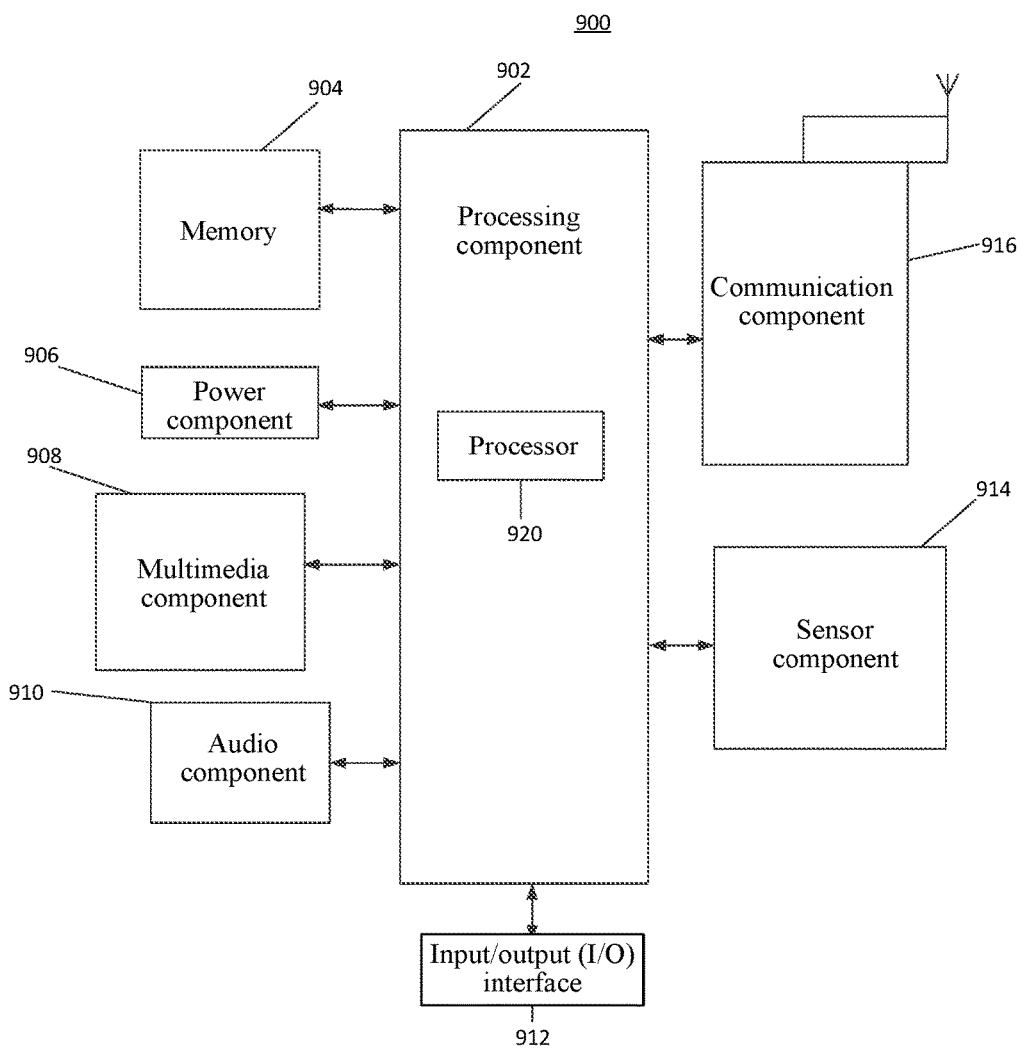
FIG. 9 is a block diagram of a device for acquiring business card information according to an example embodiment of the present disclosure.

FIG. 9 is a block diagram of a device 900 for acquiring business card information according to an example embodiment of the present disclosure. For example, the device 900 may be a mobile phone, a computer, a digital broadcasting terminal, a message sending and receiving device, a game controlling panel, a tablet device, a medical equipment, a fitness equipment, a personal digital assistant, etc.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or at least two processors 920 to execute instructions to perform all or part of the acts in the above described methods. Moreover, the processing component 902 may include one or at least two modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or at least two sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G or 3G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

Figure 10:
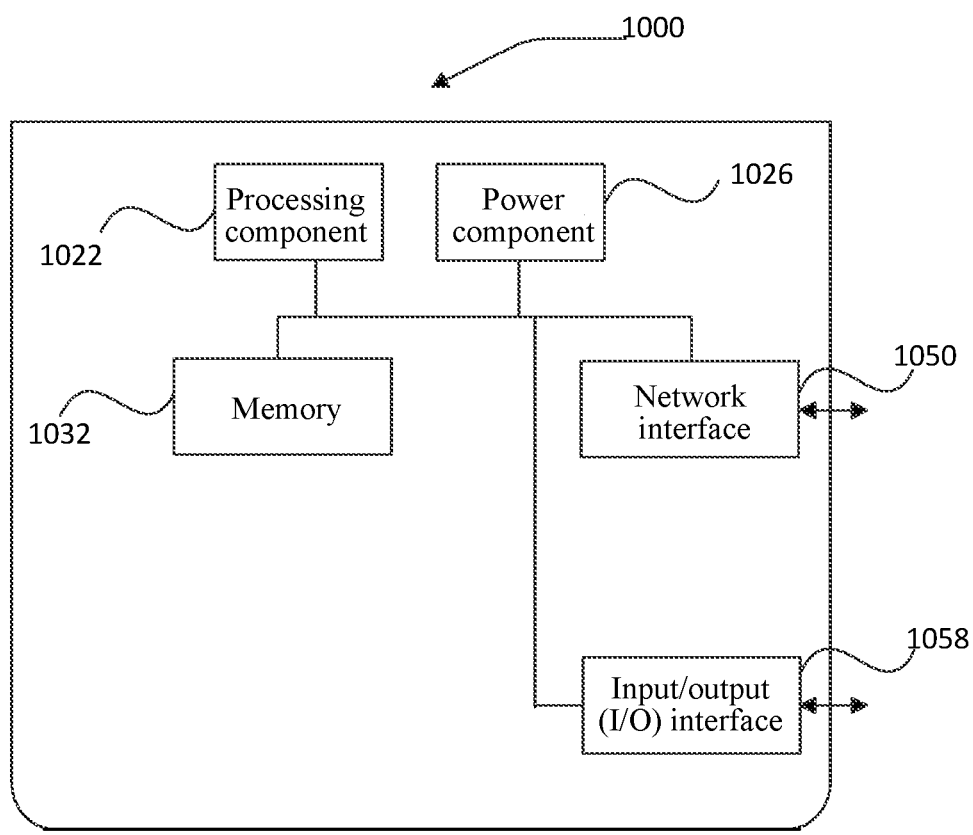
FIG. 10 is a block diagram of a device for acquiring business card information according to an example embodiment of the present disclosure.

FIG. 10 is a block diagram of a device 1000 for acquiring business card information according to an example embodiment of the present disclosure. For example, the device 1000 may be provided as a server. Referring to FIG. 10, the device 1000 includes a processing component 1022 which further includes one or more processors, and memory resources represented by a memory 1032, which is configured to store instructions executed by the processing component 1022, such as an application program. The application program stored in the memory 1032 may include one or more components each of which correspond to a series of instructions. In addition, the processing component 1022 is configured to execute instructions, so as to execute the above method for acquiring business card information on server side.

The device 1000 may also include a power component 1026 which is configured to execute a power management of the device 1000, a wired or wireless network interface 1050 which is configured to connect the device 1000 to a network, and an input/output (I/O) interface 1058. The device 1000 may operate based on an operating system stored in the memory 1032, such as Windows Server™, Mac OS X™, Unix™, Linux™, FreeBSD™ and likewise.

Other embodiments of the present disclosure will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A server-implemented method for acquiring business card information, the method comprising:
    receiving a request for acquiring business card information sent by a terminal of a first user, wherein the request for acquiring business card information comprises facial feature information of a target user;
    determining identity information of the target user according to the facial feature information of the target user;
    verifying the request for acquiring business card information sent by the terminal of the first user; and
    sending business card information corresponding to the identity information of the target user to the terminal of the first user if the request for acquiring business card information sent by the terminal of the first user is verified successfully;
    wherein the identity information indicates that the target user is a second user, and verifying the request for acquiring business card information sent by the terminal of the first user comprises:
    sending a confirmation request to a terminal of the second user, wherein the confirmation request is used for asking the second user to determine whether the request for acquiring business card information sent by the terminal of the first user is allowed;
    receiving a confirmation response sent by the terminal of the second user; and
    determining that the request for acquiring business card information sent by the terminal of the first user is verified successfully if the confirmation response indicates that the request for acquiring business card information sent by the terminal of the first user is allowed by the second user.

2. The method according to claim 1, wherein determining identity information of the target user according to the facial feature information of the target user comprises:
    traversing a first facial feature information set and judging whether facial feature information matching with the facial feature information of the target user is included in the first facial feature information set, wherein the first facial feature information set comprises facial feature information of all registered users; and
    determining identity information of a registered user corresponding to the facial feature information matching with the facial feature information of the target user as the identity information of the target user if it is judged that the facial feature information matching with the facial feature information of the target user is included in the first facial feature information set.

3. The method according to claim 1, wherein determining identity information of the target user according to the facial feature information of the target user comprises:
    traversing a second facial feature information set and judging whether facial feature information matching with the facial feature information of the target user is included in the second facial feature information set, wherein the second facial feature information set comprises facial feature information of a registered user sending a request for acquiring business card information in a preset target time period; and
    determining identity information of a registered user corresponding to the facial feature information matching with the facial feature information of the target user as the identity information of the target user if it is judged that the facial feature information matching with the facial feature information of the target user is included in the second facial feature information set.

4. The method according to claim 3, wherein determining identity information of the target user according to the facial feature information of the target user further comprises:
    traversing a third facial feature information set and judging whether the facial feature information matching with the facial feature information of the target user is included in the third facial feature information set if it is determined that the facial feature information matching with the facial feature information of the target user is not included in the second facial feature information set, wherein the third facial feature information set comprises facial feature information of a registered user not sending a request for acquiring business card information in the preset target time period; and
    determining the identity information of the registered user corresponding to the facial feature information matching with the facial feature information of the target user as the identity information of the target user if it is judged that the facial feature information matching with the facial feature information of the target user is included in the third facial feature information set.

5. The method according to claim 2, further comprising:
    receiving a facial image and business card information uploaded by each registered user before receiving the request for acquiring business card information sent by the terminal of the first user;
    determining facial image information of each registered user according to the facial image uploaded by each registered user; and storing the facial image information and the business card information of each registered user.

6. The method according to claim 3, further comprising:
receiving a facial image and business card information uploaded by each registered user before receiving the request for acquiring business card information sent by the terminal of the first user;
determining facial image information of every registered user according to the facial image uploaded by each registered user; and
storing the facial image information and the business card information of each registered user.

7. The method according to claim 4, further comprising:
receiving a facial image and business card information uploaded by each registered user before receiving the request for acquiring business card information sent by the terminal of the first user;
determining facial image information of each registered user according to the facial image uploaded by each registered user; and
storing the facial image information and the business card information of each registered user.

8. The method according to claim 1, wherein the identity information indicates that the target user is a second user; and
verifying the request for acquiring business card information sent by the terminal of the first user comprises:
judging whether a request for acquiring business card information sent by a terminal of the second user is received;
judging whether facial feature information of the first user is included in the request for acquiring business card information sent by the terminal of the second user if the request for acquiring business card information sent by the terminal of the second user is received; and
determining that the request for acquiring business card information sent by the terminal of the first user is verified successfully if the facial feature information of the first user is included in the request for acquiring business card information sent by the terminal of the second user.

9. The method according to claim 8, further comprising:
sending business card information of the first user to the terminal of the second user if the request for acquiring business card information sent by the terminal of the first user is verified successfully.

10. A device for acquiring business card information, comprising:
a processor;
a memory for storing an instruction executable by the processor;
wherein the processor is configured to perform:
receiving a request for acquiring business card information sent by a terminal of a first user, wherein the request for acquiring business card information comprises facial feature information of a target user;
determining identity information of the target user according to the facial feature information of the target user;
verifying the request for acquiring business card information sent by the terminal of the first user; and
sending business card information corresponding to the identity information of the target user to the terminal of the first user if the request for acquiring business card information sent by the terminal of the first user is verified successfully;
wherein the identity information indicates that the target user is a second user, and the processor is configured to verify the request for acquiring business card information sent by the terminal of the first user by acts of:
sending a confirmation request to a terminal of the second user, wherein the confirmation request is used for asking the second user to determine whether the request for acquiring business card information sent by the terminal of the first user is allowed;
receiving a confirmation response sent by the terminal of the second user; and
determining that the request for acquiring business card information sent by the terminal of the first user is verified successfully if the confirmation response indicates that the request for acquiring business card information sent by the terminal of the first user is allowed by the second user.

11. The device according to claim 10, wherein the identity information indicates that the target user is a second user; and
verifying the request for acquiring business card information sent by the terminal of the first user comprises:
judging whether a request for acquiring business card information sent by a terminal of the second user is received;
judging whether facial feature information of the first user is included in the request for acquiring business card information sent by the terminal of the second user if the request for acquiring business card information sent by the terminal of the second user is received; and
determining that the request for acquiring business card information sent by the terminal of the first user is verified successfully if the facial feature information of the first user is included in the request for acquiring business card information sent by the terminal of the second user.

12. The device according to claim 11, wherein the processor is further configured to:
send business card information of the first user to the terminal of the second user if the request for acquiring business card information sent by the terminal of the first user is verified successfully.

13. The device according to claim 10, wherein the processor is configured to determine identity information of the target user according to the facial feature information of the target user by acts of:
traversing a first facial feature information set and judging whether facial feature information matching with the facial feature information of the target user is included in the first facial feature information set, wherein the first facial feature information set comprises facial feature information of all registered users; and
determining identity information of a registered user corresponding to the facial feature information matching with the facial feature information of the target user as the identity information of the target user if it is judged that the facial feature information matching with the facial feature information of the target user is included in the first facial feature information set.

14. The device according to claim 13, wherein the processor is further configured to:
receive a facial image and business card information uploaded by each registered user before receiving the request for acquiring business card information sent by the terminal of the first user;
determine facial image information of each registered user according to the facial image uploaded by each registered user; and store the facial image information and the business card information of each registered user.

15. The device according to claim 10, wherein the processor is configured to determine identity information of the target user according to the facial feature information of the target user by acts of:

traversing a second facial feature information set and judging whether facial feature information matching with the facial feature information of the target user is included in the second facial feature information set, wherein the second facial feature information set comprises facial feature information of a registered user sending a request for acquiring business card information in a preset target time period; and determining identity information of a registered user corresponding to the facial feature information matching with the facial feature information of the target user as the identity information of the target user if it is judged that the facial feature information matching with the facial feature information of the target user is included in the second facial feature information set.

16. The device according to claim 15, wherein the processor is further configured to determine identity information of the target user according to the facial feature information of the target user by acts of:

traversing a third facial feature information set and judging whether the facial feature information matching with the facial feature information of the target user is included in the third facial feature information set if it is determined that the facial feature information matching with the facial feature information of the target user is not included in the second facial feature information set, wherein the third facial feature information set comprises facial feature information of a registered user not sending a request for acquiring business card information in the preset target time period; and determining the identity information of the registered user corresponding to the facial feature information matching with the facial feature information of the target user as the identity information of the target user if it is judged that the facial feature information matching with the facial feature information of the target user is included in the third facial feature information set.

\* \* \* \* \*